W. E. TRUFANT.
FRICTION GEARING FOR AUTOMOBILES.
APPLICATION FILED MAR. 8, 1912.
1,172,503. Patented Feb. 22, 1916.
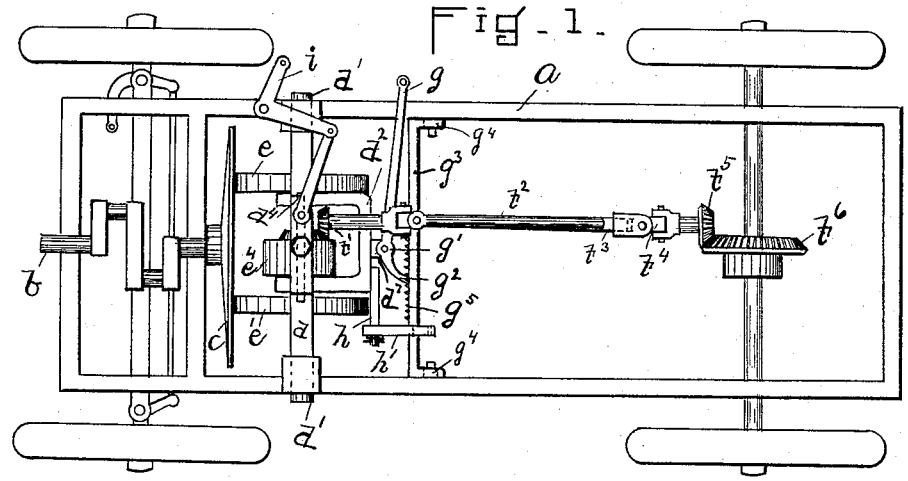
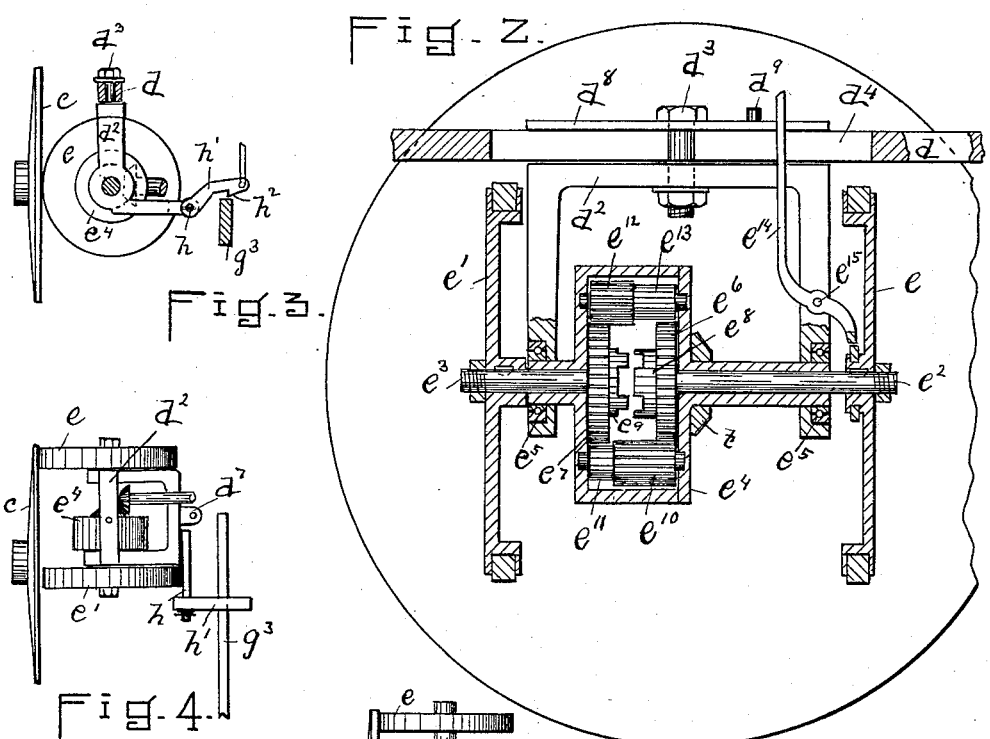
WITNESSES.
Rosanna Callanan
G. Howard Soule
INVENTOR.
W. E. Trufant

UNITED STATES PATENT OFFICE.

WALTER E. TRUFANT, OF WHITMAN, MASSACHUSETTS.

FRICTION-GEARING FOR AUTOMOBILES.

1,172,503.   Specification of Letters Patent.   Patented Feb. 22, 1916.

Application filed March 8, 1912. Serial No. 682,529.

*To all whom it may concern:*

Be it known that I, WALTER E. TRUFANT, of Whitman, in the county of Plymouth and State of Massachusetts, have invented certain new and useful Improvements in Friction-Gearing for Automobiles, of which the following is a specification.

This invention relates to friction gearing adapted to transmit power in automobiles and other classes of machinery, and has for its object to provide a simple construction and to so arrange the friction surfaces and the operating parts that the velocity of the contact surfaces shall be as great when the driven shaft is at rest or revolving at its slowest speed as when on the higher speeds, so that all the power of the engine when running at its maximum output of power may be used to start the load, and as the speed of the driven shaft increases the velocity of the friction surfaces is not increased but is always so regulated that excessive slippage, pressure or velocity for the work to be done is avoided and the efficiency and durability of the mechanism is enhanced. Heretofore in this class of transmission mechanism when no modifying gearing is used the velocity of the surfaces at the slower speeds of the driven shaft is so slow that the drive is inefficient and great pressure is required to prevent slipping, and both the pressure and the slipping are destructive of the working parts; and when two rolls and differential gearing is used the speed is always slow as when the two rolls are on opposite sides of the center of the driving disk and the usual differential mechanism is used between them to transmit the power, the velocity of the driven shaft is always slow, it being but one half the difference in the speed of the rolls, and also when more than one roll is used there has been difficulty in keeping the pressure on the rolls uniform. To the end stated my invention consists in mounting the friction rolls on a carriage, one on each side of the center of the disk and modifying the action of the rolls by differential gearing and in locking the differential gearing and using one roll to transmit the power at high speeds, and in other desirable features which are hereinafter described and pointed out in the claims.

In the accompanying drawings forming a part of this specification, Figure 1 shows my invention applied to an automobile running gear, Fig. 2 is an enlarged view, partly in section, of the sliding carriage with the friction rolls and differential gearing, Fig. 3 represents a side view of the carriage with one of the rolls removed, Fig. 4 shows a plan view of the disk, carriage and rolls in a different position from that shown in Fig. 1, with some of the parts removed, Fig. 5 is a sketch showing a modification of some of the parts.

In all the figures the same letters represent the same or equivalent parts and for the sake of clearness many parts and minor details are omitted.

$a$ represents the frame of an automobile, $b$ the power shaft which may be actuated by any suitable motor and $c$ the friction disk keyed to the power shaft. Raised above the frame before the face of the disk is the square cross bar $d$ having a perpendicular slot $d^4$ and having its ends cylindrical at $d^1$ $d^1$ to permit a rotary motion in its connection to the frame. Suspended from the bar $d$ by the bolt $d^3$ which passes through and slides in the slot $d^4$ is the carriage $d^2$. This carriage shown in detail in Fig. 2 carries by the bearings $e^5$ $e^5$ the differential case $e^4$. Extending from one end of the differential case is the shaft $e^2$ which carries on the other end the gear $e^6$ and clutch member $e^8$ and on the outer end the friction roll $e$. At the other end of the case is the shaft $e^3$ carrying at the inner end the clutch member $e^9$ adapted to engage the member $e^8$ and the gear $e^7$ and on the outer end the friction roll $e^1$. These shafts turn freely in the differential case, and the shaft $e^2$ is made so as to be slid axially by the lever $e^{14}$ fulcrumed at $e^{15}$ so as to engage the clutch members and lock the shafts together. The shafts $e^2$ and $e^3$ are always differentially connected by the gears $e^{11}$ and $e^{12}$ and their complemental gears which are not shown. These gears are of the usual construction except that in the gear $e^{11}$ the toothed part $e^{10}$ is longer and in $e^{12}$ the plain part $e^{13}$ is longer than usual to allow the gear $e^6$ to be kept in proper mesh when its shaft is moved to engage the clutch $e^8$ $e^9$.

Fixed to the differential case is the bevel gear $f$ and properly journaled to the carriage $d^1$ and in mesh with this gear is the gear $f^1$ see Fig. 1. The latter gear is connected by a universal joint with the shaft $f^2$ and the shaft is squared at $f^3$ to make a slip joint with the universal joint $f^4$. To the other end of this joint is connected the shaft carrying the gear $f^5$ which meshes with the gear $f^6$ on the differential mechanism of the rear axle of the automobile.

On the front of the carriage $d^2$ is the lug $d^7$ to which is fulcrumed the lever $g$ at $g^1$. The short end of the lever $g$ rests against the crossbar $g^3$ which is bolted through slots $g^4$ $g^4$ to allow for adjustment. Teeth $g^5$ are placed on the bar to lock the carriage when pressure is put on the lever. The long end of the lever is operated in the ordinary way by a ratcheted foot lever of the usual construction. On the front of the carriage is the bar $h$ to which is pivoted the latch $h^1$.

Power is applied by any suitable engine to rotate the disk $c$ and by means of the lever $g$ the friction rolls $e$ $e^1$, which may be faced with fiber or any suitable material, are brought in contact therewith. The carriage swings with the bar $d$ and swivels on the bolt $d^3$ so that when the fulcrum of the lever $g$ brings pressure on the carriage the pressure on each roll is uniform regardless of how much they have been affected relatively by wear. When the carriage is in the position shown in Fig. 1, that is with the rolls at equal distance from the center of the disk, there will be no movement transmitted to the differential case as the rolls will rotate in opposite directions and the gears in the case will idle. If however the carriage is shifted along the bar $d$ by means of the stud $d^9$ in the plate $d^8$ and lever $i$ to the right the roll farthest from the center of the disk will rotate faster than the other and a forward movement will be given to the differential case at a rate equal to one half the difference of the speed of the rolls. As the rolls are moved farther to the right the speed increases until when the right hand roll is near the periphery of the disk and the other near the center and thus almost stationary the speed will be nearly one half the speed of the right hand roll. To get the reverse motion of the automobile the carriage is moved to bring the left hand roll farthest from the center of the disk so that the differential case will rotate in the opposite direction from that just described. I will not describe this part of the device further as the action of the differential gearing is well known.

When the work is light or it is desirable to travel at a higher rate of speed than the action of the differential gearing will allow, the left hand roll is prevented from touching the disk by allowing the shoulder $h^2$ of the latch $h^1$ to engage the bar $g^3$ as shown in Fig. 4. The clutch members $e^8$ and $e^9$ are then engaged by shifting the shaft and roll by means of the lever $e^{14}$ which locks the differential gears so that when the right hand roll is pressed against the disk the rotation of the differential case will be the same as the roll and the rolls and the differential case turn as one. The power is then transmitted the same as with the well known plain friction disk drive. I do not use the single roll drive on the reverse as high speed backward is not desirable.

In Fig. 5 I show a sketch of a disk and rolls in which two rolls are set quite near together so that while the velocity of the friction surfaces at the slower speeds would not be as great, when they are moved so that both are on the same side of the center of the disk as shown in the figure the speed will be much faster as the resultant of the differential motion will be one half the sum of the speed of the two rolls, and the difference between the highest speed with the differential working and that with it locked would not be as great as in the arrangement shown in the other figures.

It is obvious that the operation of the gearing may be still further modified by making the gears $e^7$ $e^6$ of different diameters, and that instead of lifting one of the rolls from the disk when the differential is locked one of the rolls may be uncoupled from the differential and idle while the other transmits the power; this however would make greater complication of parts and more wear.

What I claim as new, and desire to secure by Letters Patent of the United States, is—

1. In a transmission gearing the combination of, a friction disk, a carriage mounted on a swivel in front of said disk, said carriage being pivoted to swing toward and from the disk, and being mounted to slide along the face of the disk, two rolls mounted on said carriage to contact with said disk, a differential gearing, each of said rolls being connected with one of the differential members, each of said differential members having a clutch surface, one of said differential members being formed to slide axially to engage said clutch surfaces, a latch to hold one of the rolls out of contact with the disk, a lever to apply pressure to said rolls at a point between them, and means to lock said carriage against sliding motion when said pressure is applied.

2. In transmission gearing the combination of, a friction disk, a carriage mounted on a swivel in front of said disk, said carriage being pivoted to swing toward and from the disk, and being mounted to slide along the face of the disk, two rolls mounted on said carriage to contact with said disk, differential gearing, each of said rolls being connected with one of the differential members, each of said differential members having a clutch surface, one of said differential members being formed to slide axially to engage said clutch surfaces, means to apply pressure to said rolls at a point between them, and means to hold one of the rolls out of contact with the disk.

3. In transmission gearing the combination of, a friction disk, a carriage mounted on a swivel in front of said disk, said carriage being pivoted to swing toward and from the disk, and being mounted to slide along the face of the disk, two rolls mounted on said carriage to contact with said disk, differential gearing, each of said rolls being connected with one of the differential members, each of said differential members having a clutch surface, one of said differential members being formed to slide axially to engage said clutch surfaces, means to hold one of the rolls out of contact with the disk, and means to lock said carriage against sliding motion when said pressure is applied.

4. In transmission gearing the combination of, a friction disk, a carriage mounted on a swivel in front of said disk, said carriage being pivoted to swing toward and from the disk, and being mounted to slide along the face of the disk, two rolls mounted on said carriage to contact with said disk, differential gearing, each of said rolls being connected with one of the differential members, each of said differential members having a clutch surface, one of said differential members being formed to slide axially to engage said clutch surfaces, and means to apply pressure to said rolls at a point between them.

5. In transmission gearing the combination of, a friction disk, a carriage mounted on a swivel in front of said disk, said carriage being pivoted to swing toward and from the disk, and being mounted to slide along the face of the disk, two rolls mounted on said carriage to contact with said disk, differential gearing, each of said rolls being connected with one of the differential members, each of said differential members having a clutch surface, one of said differential members being formed to slide axially to engage said clutch surfaces, means to hold one of the rolls out of contact with the disk, and means to lock said carriage against sliding motion.

6. In transmission gearing the combination of, a friction disk, a carriage mounted on a swivel in front of said disk, said carriage being pivoted to swing toward and from the disk, and being mounted to slide along the face of the disk, two rolls mounted on said carriage to contact with said disk, differential gearing, each of said rolls being connected with one of the differential members, each of said differential members having a clutch surface, one of said differential members being formed to slide axially to engage said clutch surfaces, and means to hold one of the rolls out of contact with the disk.

7. In transmission gearing the combination of, a friction disk, a carriage mounted on a swivel in front of said disk, said carriage being pivoted to swing toward and from the disk, and being mounted to slide along the face of the disk, two rolls mounted on said carriage to contact with said disk, and differential gearing, each of said rolls being connected with one of the differential members, each of said differential members having a clutch surface, one of said differential members being formed to slide axially to engage said clutch surfaces.

8. In transmission gearing the combination of, a friction disk, a carriage mounted on a swivel in front of said disk, said carriage being pivoted to swing toward and from the disk, and being mounted to slide along the face of the disk, two rolls mounted on said carriage to contact with said disk, differential gearing, each of said rolls being connected with one of the differential members, means to apply pressure to said rolls at a point between them, means to hold one of the rolls out of contact with the disk, and means to lock said carriage against sliding motion.

9. In transmission gearing the combination of, a friction disk, a carriage mounted on a swivel in front of said disk, said carriage being pivoted to swing toward and from the disk, and being mounted to slide along the face of the disk, two rolls mounted on said carriage to contact with said disk, differential gearing, each of said rolls being connected with one of the differential members, means to apply pressure to said rolls at a point between them, and means to hold one of the rolls out of contact with the disk.

10. In transmission gearing the combination of, a friction disk, a carriage mounted on a swivel in front of said disk, said carriage being pivoted to swing toward and from the disk, and being mounted to slide along the face of the disk, two rolls mounted on said carriage to contact with said disk, differential gearing, each of said rolls being connected with one of the differential members, and means to apply pressure to said rolls at a point between them.

11. In transmission gearing the combination of, a friction disk, a carriage mounted on a swivel in front of said disk, said carriage being pivoted to swing toward and from the disk, and being mounted to slide along the face of the disk, two rolls mounted on said carriage to contact with said disk, and differential gearing, each of said rolls being connected with one of the differential members.

12. In transmission gearing the combination of, a friction disk, a carriage mounted on a swivel in front of said disk, said carriage being pivoted to swing toward and from the disk, and being mounted to slide along the face of the disk, two rolls mounted on said carriage to contact with said disk, means to apply pressure to said rolls at a point between them, means to hold one of the rolls out of contact with the disk, and means to lock said carriage against sliding motion.

13. In transmission gearing the combination of, a friction disk, a carriage mounted on a swivel in front of said disk, said carriage being pivoted to swing toward and from the disk, and being mounted to slide along the face of the disk, two rolls mounted on said carriage to contact with said disk, means to apply pressure to said rolls at a point between them, and means to hold one of the rolls out of contact with the disk.

14. In transmission gearing the combination of, a friction disk, a carriage mounted on a swivel in front of said disk, said carriage being pivoted to swing toward and from the disk, and being mounted to slide along the face of the disk, two rolls mounted on said carriage to contact with said disk, means to apply pressure to said rolls at a point between them, and means to lock said carriage against sliding motion.

15. In transmission gearing the combination of, a friction disk, a carriage mounted on a swivel in front of said disk, said carriage being pivoted to swing toward and from the disk, and being mounted to slide along the face of the disk, two rolls mounted on said carriage to contact with said disk, and means to apply pressure to said rolls at a point between them.

16. In transmission gearing the combination of, a friction disk, a carriage mounted on a swivel in front of said disk, said carriage being pivoted to swing toward and from the disk, and being mounted to slide along the face of the disk, differential gearing, and means for applying pressure to said rolls to bring them in contact with said disk, two rolls mounted on said carriage to contact with said disks, said rolls being operatively connected with said differential gearing.

17. In transmission gearing the combination of, a friction disk, a carriage mounted in front of said disk, two rolls mounted on said carriage to contact with said disk, differential gearing, each of said rolls being connected with one of the differential members, each of said differential members having a clutch surface, one of said differential members being formed to slide axially to engage said clutch surfaces, and means to apply pressure to said rolls at a point between them.

18. In transmission gearing the combination of, a friction disk, a carriage mounted in front of said disk, two rolls mounted on said carriage to contact with said disk, differential gearing, each of said rolls being connected with one of the differential members, each of said differential members having a clutch surface, one of said differential members being formed to slide axially to engage said clutch surfaces, means to apply pressure to said rolls at a point between them, and means to hold one of the rolls out of contact with the disk.

19. In transmission gearing the combination of, a friction disk, a carriage mounted in front of said disk, two rolls mounted on said carriage to contact with said disk, differential gearing, each of said rolls being connected with one of the differential members, each of said differential members having a clutch surface, one of said differential members being formed to slide axially to engage said clutch surfaces, means to apply pressure to said rolls at a point between them, and means to lock said carriage against sliding motion.

20. In transmission gearing the combination of, a friction disk, a carriage mounted in front of said disk, two rolls mounted on said carriage to contact with said disk, differential gearing, each of said rolls being connected with one of the differential members, each of said differential members having a clutch surface, one of said differential members being formed to slide axially to engage said clutch surfaces, and means to hold one of the rolls out of contact with the disk.

21. In transmission gearing the combination of, a friction disk, a carriage mounted in front of said disk, two rolls mounted on said carriage to contact with said disk, and differential gearing, each of said rolls being connected with one of the differential members, each of said differential members having a clutch surface, one of said differential members being formed to slide axially to engage said clutch surfaces.

22. In transmission gearing the combination of, a differential case, a pair of intermeshing complemental spur gears within said differential case, coaxial shafts extending from said case parallel with said complemental gears, a gear mounted on each of said shafts meshing with said complemental gears, each of said gears having a clutch surface adapted to engage the clutch surface on the other gear, and means for sliding one of said gears axially while still in mesh with the complemental gears to lock the shafts together.

23. In a transmission gearing the combination of, a friction disk, a carriage mounted to slide along the face of the disk, two rolls mounted on said carriage, differential gearing, each of said rolls being connected with one of the differential members, a clutch to lock said differential members, a latch to hold one of the rolls out of contact with the disk, and a lever to apply pressure to said rolls at a point between them.

24. In a transmission gearing the combination of, a friction disk, two rolls mounted in front of said disk, differential gearing, each of said rolls being connected with one of the differential members, means to lock the differential gearing, and means to cause one of the rolls to idle while the other transmits the power.

25. In a transmission gearing the combination of, a friction disk, two rolls mounted in front of said disk, differential gearing, each of said rolls being connected with one of the differential members, and means to lock said differential gearing.

26. In a transmission gearing the combination of, a friction disk, two rolls mounted in front of said disk, and means for applying pressure between said rolls to bring them in contact with the disk.

27. In a transmission gearing the combination of, a friction disk, a carriage on a swivel in front of said disk, a roll mounted on said carriage, and means to move the carriage along the face of the disk.

28. In a transmission gearing the combination of, a friction disk, two rolls mounted one on each side of the center before the face of said disk, means to modify the action of said rolls, means to transmit power from said modifying means, and means to transmit the power from one of said rolls unmodified by said modifying means.

29. In a transmission gearing the combination of, a friction disk, a carriage mounted in front of said disk, two rolls mounted on said carriage, and means for holding one of said rolls out of contact with said disk independently of the other roll.

30. In transmission gearing the combination of, a friction disk, differential gearing, two rolls mounted in front of said disk to contact with same, means for applying pressure to said rolls, and means for equalizing the pressure on said rolls when said disk and rolls are brought in contact.

In testimony whereof I have affixed my signature, in the presence of two witnesses.

WALTER E. TRUFANT.

Witnesses:
G. Howard Soule,
Rosanna Callanan.

Copies of this patent may be obtained for five cents each, by addressing the "Commissioner of Patents, Washington, D. C."